Aug. 5, 1969 R. E. TWEED 3,459,505
METHOD OF TESTING THE POROSITY OF COATED ARTICLES
Filed Oct. 11, 1965
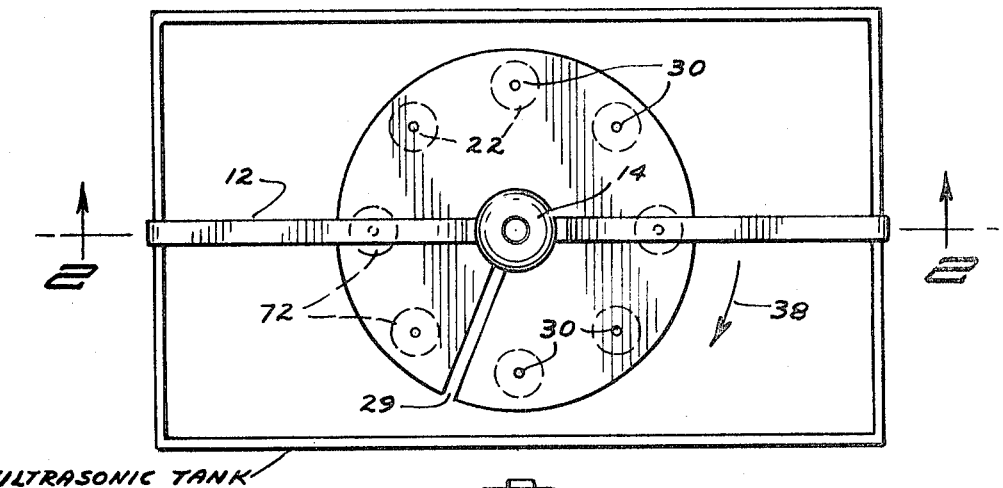
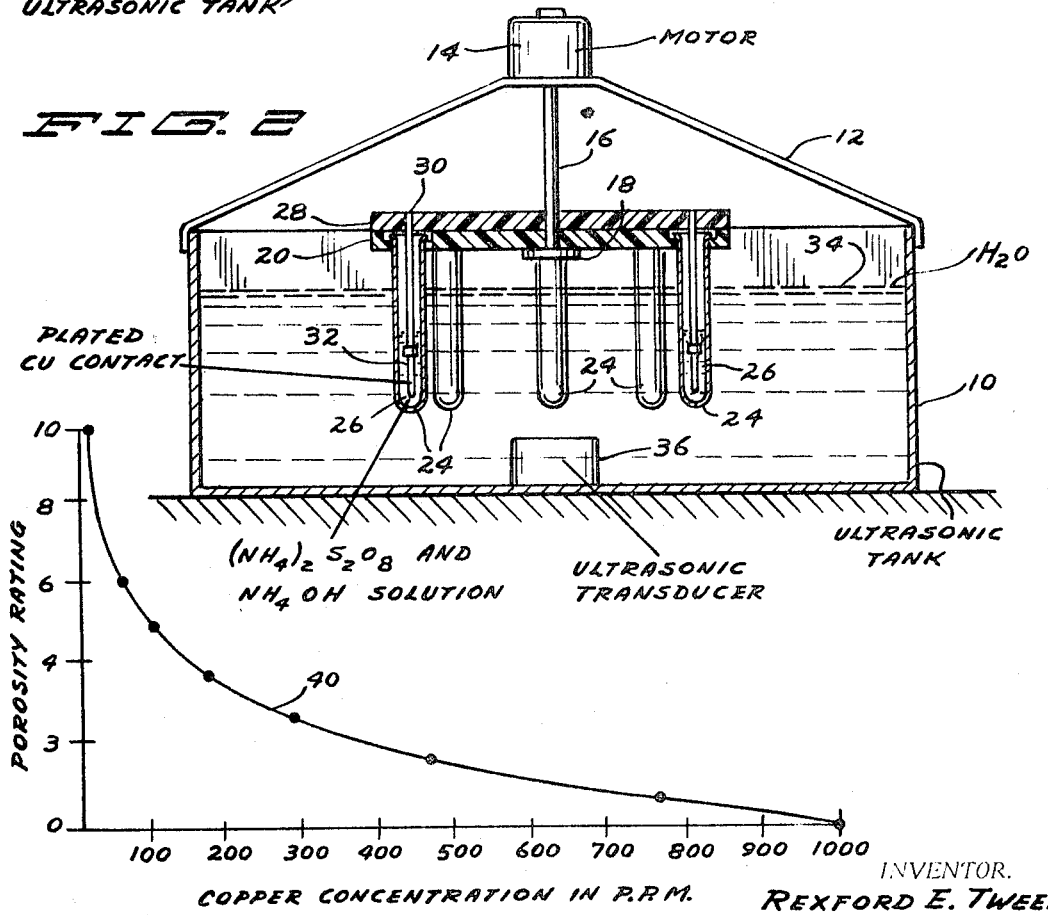
INVENTOR.
REXFORD E. TWEED
BY
Meyers & Peterson
ATTORNEYS

United States Patent Office 3,459,505
Patented Aug. 5, 1969

3,459,505
METHOD OF TESTING THE POROSITY OF COATED ARTICLES
Rexford E. Tweed, Mound, Minn., assignor, by mesne assignments, to United-Carr Incorporated, Boston, Mass., a corporation of Delaware
Filed Oct. 11, 1965, Ser. No. 494,718
Int. Cl. G01n 33/20
U.S. Cl. 23—230                                      8 Claims

ABSTRACT OF THE DISCLOSURE

Articles to be tested are suspended in an ultrasonically agitated reagent capable of chemically dissolving the basis metal but not the coating, and the reagent is subsequently tested for the basis metal.

---

This invention relates generally to a method of testing the porosity of coated metallic articles, and pertains more particularly to a method having especial utility in the testing of electrical connector contacts which are plated for the purpose of preventing corrosion by shielding the basis metal from exposure to environmental substances.

Although the present invention will have wider utility than in the testing of connector contacts, nonetheless, it will be of particular benefit when checking the porosity of the coating or plating thereon. Plating porosity varies, depending on the plating process, as well as the metal deposited. Consequently, utilization of a satisfactory porosity test is essential for quality assurance evaluations of plating processes as applied to connector contacts. Otherwise, the connector contact can corrode and thus fail in actual service; sometimes the continuity of service is quite crucial and therefore the present invention provides a reliable porosity testing method that will make certain that the contact is suitable for its intended purpose.

One object of the invention is to provide a method for determining the porosity of a coating on a basis metal that will be quantitative as well as qualitative. In this regard, the invention has for an aim the provision of a method or process that will give a correct indication of the amount of porosity present in the coating of the particular article, thereby allowing an accurate decision to be made as to whether such an article should be accepted or rejected. Consequently, where the article is to be utilized in a corrosive atmosphere, such as where electrical contacts are frequently employed, then it can be determined in advance whether the contact will withstand the adverse exposure to which it will be subjected in practice.

Another object of the invention is to provide a reliable porosity testing method that can be accomplished on an accelerated basis. More specifically, it is an aim of the invention to provide a test that can be completed in a matter of minutes whereas other tests in the past have taken a day or two. Stated somewhat differently, the present invention provides for a relatively constant rate of solution or liquid reagent replenishment at the site of dissolution, thereby accelerating the testing procedure, as well as enhancing the reliability thereof as mentioned above.

Still further, the invention has for an additional object the testing of plated articles, such as electrical contacts, having relatively small or minute pores in their coatings. Where the pore is particularly small, it is apt to block the entrance of the attaching solution due to the resulting surface tension. The present invention provides what amounts to a multiplicity of small implosions which greatly assist in the passage of the solution into contact with the basis metal. In other words, the implosions overpower the surface tension and allow the solution of liquid reagent to migrate rapidly through the pores of the coating, even though such pores are of small cross section.

Yet another object of the invention is to provide a porosity test that while primarily intended to check the porosity of the coating or plating results in a testing of the condition of the basis metal itself. More specifically, if the basis metal possesses defects, such as scratches, nicks, and poor adhesion, the porosity test when conducted in accordance with the teachings of the present invention will provide a poor rating when such defects or faults are present. Consequently, the user of my process is given an overall indication of the quality of the article. Hereagain, this possesses especial value when checking connector contacts, for the contact can be rejected easily irrespective of whether the coating is to blame or the condition of the basis metal itself is the cause of the poor test rating.

A further object of the invention is to provide a porosity test that will not only be reliable but which will be of a nondestructive character. Thus, those articles that do fail to pass the test can be rejected and yet those that pass will not be adversely affected as a result of the procedure that is utilized. Consequently, the user of my method need not resort to a sampling type of test because he can test each and every item if circumstances so dictate.

Quite briefly, the invention involves the selection of an appropriate liquid reagent or solution which will attack the basis metal but not the coating. By subjecting the article to be tested to ultrasonic vibrations when immersed in the test solution, the liquid reagent will dissolve a certain amount of the basis metal, the amount being governed by the amount of porosity present in the coating. By determining the amount of basis metal that has been dissolved, an indication is provided as to whether the porosity is of such an extent that the article should be rejected.

The above objects of the invention will be better appreciated when considered in connection with the following description and the accompanying drawing in which:

FIGURE 1 is a top plan view of apparatus that can be employed when practicing my invention;

FIGURE 2 is a sectional view taken in the direction of line 2—2 of FIGURE 1; and FIGURE 3 is a graph showing the porosity rating versus concentration of copper in parts per million, the copper being the basis metal in the illustrative situation.

Referring now in detail to the drawing, an ultrasonic tank has been given the reference numeral 10. Although a variety of supports can be utilized, a bridge 12 in the form of a removable strip has been employed for supporting an electric motor 14. The motor 14 has a downwardly depending shaft 16 with an enlarged head or knob 18 at its lower extremity. The knob 18 may be detachable if desired and this can facilitate the testing procedure as will become better understood hereinafter.

It will be perceived from FIGURE 2 that the apparatus includes a test tube rack 20 in the form of a circular disc having any preferred number of counterbores 22 formed therein; eight such counterbores 22 have been shown in the exemplary situation. Each counterbore 22 is of a size so as to accommodate a test tube 24, the flared end of each test tube 24 being such that it prevents the test tube from dropping through the counterbore. In other words, the test tube rack 20 suspends any desired number of test tubes 24, there being eight in the illustrative example.

Although the specimen to be tested has not yet been referred to, nonetheless, it will be assumed that the basis metal of the specimen is copper or copper based alloy and for this reason a liquid reagent or solution composed of $(NH_4)_2S_2O_8$ (ammonium persulfate) and 50 percent $NH_4OH$ (ammonium hydroxide), the foregoing percentages being on a volumetric basis. The solution or liquid reagent has been indicated by the refernce numeral 26. The amount is of a predetermined character and in practice ten milliliters have been selected as an appropriate quantity. The particular solution 26 has been selected because it attacks only the copper and not the coating which may be any one of the following: gold, gold and silver, rhodium, rhodium and gold, nickel, gold and nickel or tin-nickel alloy.

Next to be described is the specimen rack 28. From FIGURE 1, it will be discerned that there is a radially directed slot 29 that allows the rack 28 to be placed in an encircling relationship with the shaft 16. This is but one way that the rack can be utilized, it also being possible where the knob 18 is of a detachable nature to remove the knob and thus insert the shaft 16 through centrally disposed holes in the members 20 and 28. Actually, the bridge 12 should be shaped so as to permit the rack 28 to be placed on the rack 20. These details are virtually unimportant to the practicing of the invention other than that both racks 20, 28 are rendered rotatable by reason of their support on the shaft 16 which is rotatable by the motor 14.

The function of the specimen rack 28 is to carry a number of plastic rods 30 that project downwardly from the underside thereof into the test tubes 24 when the rack 28 is resting on the rack 20. The plastic rods 30 in the illustrative situation afford a ready means of attaching the specimens or articles 32 which are to be tested for porosity. Since the invention will have particular utility in the testing of electrical contacts, the specimens or articles 32 have been depicted as simple pin contacts, the lower extremities of the plastic rods 30 being press-fitted into the upper ends of such pin contacts. Of course, various modes of suspending the specimens or articles may be resorted to and will depend to some extent upon the configuration of the article.

At this time, attention is directed to a water bath 34 which constitutes the vibration-transmitting medium in the present situation. The water 34 conducts the vibrations produced or generated by an ultrasonic transducer 36. The ultrasonic transducer 36 may be in the form of a Narda Model G601 Ultrasonic Generator (40 kilocycles) and the tank 10 can be a Narda Model NT603 Ultrasonic Tank.

Having presented the foregoing information, the manner in which my invention is practiced should be readily understood. With a given amount of solution or liquid reagent 26 contained in each of the test tubes 24, the test tubes can have their lower ends inserted through the counterbores 22 and thereby suspended from the test tube rack 20. After affixing the specimens or articles 32 to the lower ends of the plastic rod 30 which are fixedly anchored at their upper ends to the specimen rack 28, the specimens can be lowered into the various test tubes 24. The motor 14 is instrumental in rotating the assemblage comprised of the racks 20 and 28, as well as the test tubes 24 and the specimens 32, the directional arrow 38 having been applied in FIGURE 1 show the rotation.

It will be understood that the temperature of the water 34 should be held relatively constant. As a matter of fact, a suggested temperature of 30° C.±30 C. is recommended. It is also suggested that a given amount of sodium lauryl sulfate be added to the water 34. Although the controls for the transducer 36 are not shown, it will be appreciated that the transducer should be energized at a predetermined level and that this degree of energization should be maintained throughout the testing period. Furthermore, the testing period should be of a predetermined duration in order to assure results of a comparative nature in order that one test can be compared with another. More will be said hereinafter concerning the comparative aspect of the matter. Still further, the transducer 36 should be allowed to operate for a given amount of time before actually starting the first test, thereby preventing or obviating any transient effect that would result during the warm-up period.

The rotation of the test tubes 24 and the specimens 32 housed therein assures that during the testing period the specimens are subjected to equal amounts of ultrasonic energy as it is transmitted through the fluid medium constituted by the water 34. After the expiration of the selected amount of time, the specimens or articles are removed, rinsed, and stored. The amount of copper extracted is then determined. A preferred way of determining the amount of copper that has been removed is by comparison of the test solution 26 that has the dissolved copper therein with a standard solution. The degree of color of the solution 26 containing the dissolved copper as compared to the standard solution will indicate the amount of porosity of the coated article.

In FIGURE 3, a standard comparison curve 40 has been graphically portrayed, a rather arbitrary porosity rating constituting the ordinate and the copper concentration in parts per million consituting the abscissa. This curve 40 was derived from the following formula:

$$\text{porosity rating} = 15 - 5 \text{ (log of p.p.m.)}$$

Consequently, a facile way of determining subsequent porosity ratings is provided by mere resort to the curve 40. More specifically, once the copper concentration has been determined by the comparison of the test solution 26 with a standard solution (or through a chemical analysis), the remaining portion of the test procedure can be done by noting the point on the curve for the particular copper concentration. Then, the porosity rating can be read for that particular point.

As a result of the foregoing procedure, the test time for determining the amount of porosity of a given coated item can be appreciably reduced. Whereas prior art attempts have resulted in a period of one or two days, the present invention allows more reliable porosity checks to be made in only a few minutes. The test is reliable and accurate, thereby proving of particular value in the testing of connector contacts for porosity and concealed defects in the basis metal. It will be appreciated that the invention is applicable to the porosity testing of relatively small items which can also be of a rather intricate construction because the method allows the liquid reagent to contact even relatively remote and hidden areas.

It is to be understood that the language used in the following claims is intended to cover all of the features of the invention hereinbefore described and all statements of the scope of the invention which, as a matter of language, can be said to fall therebetween.

I claim:

1. A method of testing the porosity of a coated metallic article comprising the steps of immersing the coated article in a liquid reagent capable of chemically dissolving only the basis metal, subjecting the article while immersed to ultrasonic agitation, and thereafter testing the liquid reagent for basis metal dissolved therein.

2. A method of testing the porosity of a coated metallic article comprising the steps of immersing the coated article in a predetermined amount of liquid reagent that chemically attacks only the basis metal, subjecting the immersed article to ultrasonic energy of a selected magnitude and for a selected period of time, and thereafter detecting the concentration of basis metal dissolved in said liquid reagent after said period of time has elapsed.

3. The method set forth in claim 2 including the additional step of comparing the resulting concentration of basis metal with a standard solution.

4. A method of testing the porosity of a plurality of coated metal articles comprising the steps of suspending a plurality of tubes in an ultrasonic tank containing a vibration-transmitting medium, each tube having therein a predetermined amount of a liquid reagent capable of chemically dissolving the basis metal of which the articles are constituted but not their coatings, immersing at least the portions of the articles to be tested for porosity in the liquid reagent contained in said tubes, subjecting said tubes and their contents to ultrasonic vibrations, and testing for the presence of basis metal dissolved in the liquid reagent contained in each tube after the tubes and their contents have been subjected to ultrasonic vibrations.

5. The method as set forth in claim 4 including the additional step of rotating said tubes to expose all of said articles to substantially the same amount of ultrasonic energy.

6. The method as set forth in claim 5 in which said rotation is continued for a predetermined period.

7. The method set forth in claim 6 in which the intensity of the ultrasonic energy is maintained constant during said predetermined period.

8. A method of testing the porosity of a coated article comprising the steps of supporting a tube in an ultrasonic tank containing a vibration-transmitting liquid in contact with the above mentioned liquid, the tube having therein a predetermined amount of a liquid reagent capable of dissolving only the basis material of the article, immersing at least a portion of the article to be tested for porosity in the liquid reagent contained in said tube, subjecting said vibration-transmitting liquid to ultrasonic vibrations while the tube with the article at least partially immersed is in contact with said vibration-transmitting liquid to increase the rate of chemically dissolving any basis material that is exposed to the liquid reagent, thence removing the article from the liquid reagent and thereafter detecting the concentration of any basis material that has been dissolved in said liquid reagent.

References Cited

UNITED STATES PATENTS 3,366,554    1/1968    Lindblad _____ 23—230 XR

OTHER REFERENCES

Krabskova-Zonickova, A., Obaly 4, No. 4, 108–9 (1958). Chem. Abstr. 53, 13434d (1959).

MORRIS O. WOLK, Primary Examiner

R. M. REESE, Assistant Examiner

U.S. Cl. X.R.

23—253; 156—2

PO-1050
(5/69)

UNITED STATES PATENT OFFICE
CERTIFICATE OF CORRECTION

Patent No. 3,459,505　　　　　Dated August 5, 1969

Inventor(s)　Rexford E. Tweed

It is certified that error appears in the above-identified patent and that said Letters Patent are hereby corrected as shown below:

Column 1, line 69, "attaching" should be --attacking--.
Column 3, line 5, "refernce" should be --reference--; line 66, "30° C.$\pm$30 C." should be --30° C.$\pm$3° C.--.

SIGNED AND
SEALED
APR 28 1970

(SEAL)
Attest:

Edward M. Fletcher, Jr.
Attesting Officer

WILLIAM E. SCHUYLER, JR.
Commissioner of Patents